July 24, 1923.
J. A. ROGERS
PNEUMATIC TIRE
Original Filed Oct. 11, 1920
1,462,942
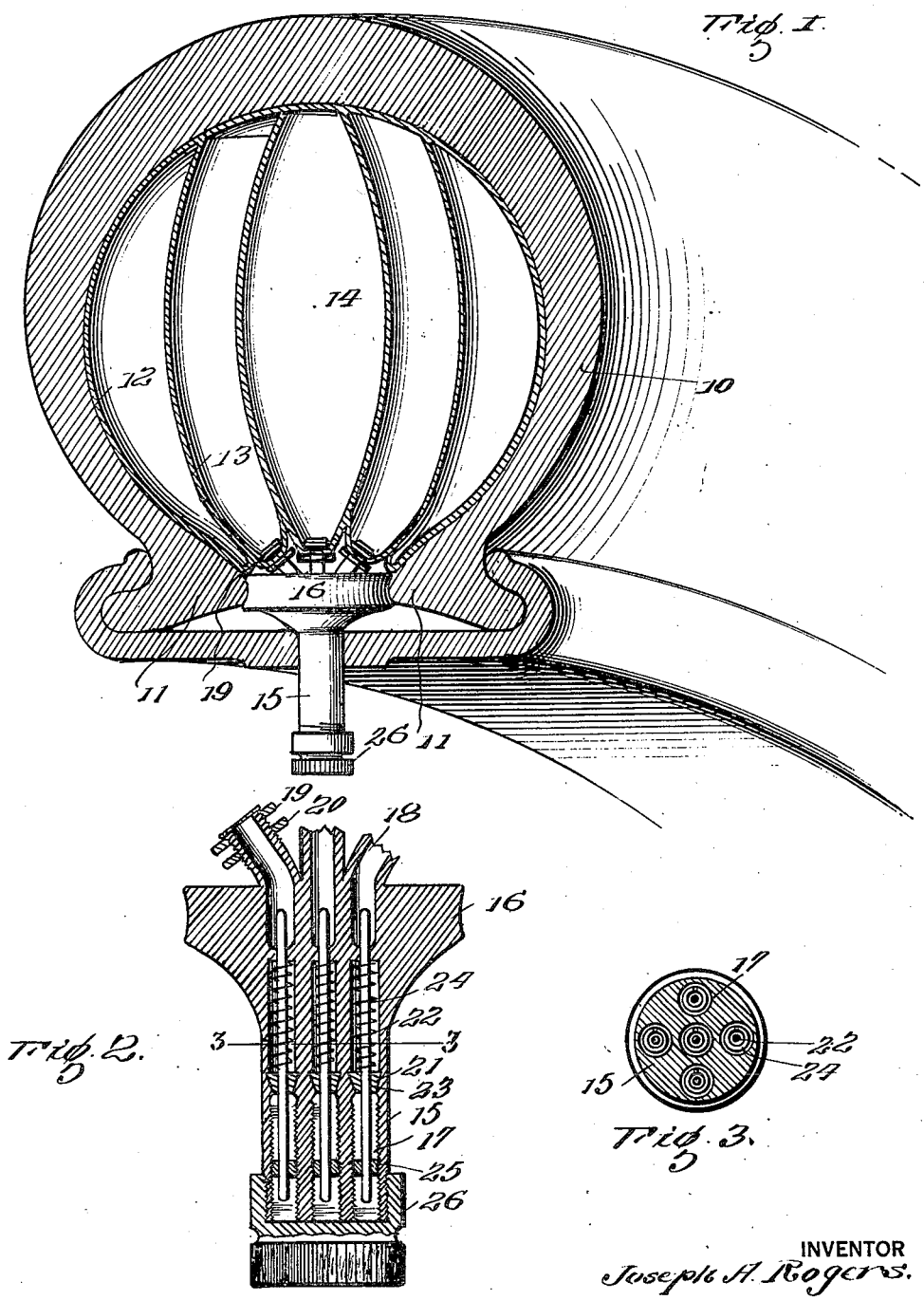

Patented July 24, 1923.

1,462,942

UNITED STATES PATENT OFFICE.

JOSEPH A. ROGERS, OF NEW YORK, N. Y.

PNEUMATIC TIRE.

Application filed October 11, 1920, Serial No. 416,161. Renewed February 12, 1923.

*To all whom it may concern:*

Be it known that I, JOSEPH A. ROGERS, a subject of the King of England, residing at New York city, in the county of New York and State of New York, have invented certain new and useful Improvements in Pneumatic Tires, of which the following is a specification.

This invention has relation to pneumatic tires, with particular reference to inner tubes therefor, and has for an object to provide an inner tube which is constructed of a plurality of flexible partitions defining annular compartments, each of which are independent and separably inflated so that in the event one compartment should be punctured the rest will be unaffected and the form and rotundity of the pneumatic tire casing will be undisturbed.

Another object of the invention is to provide an improved air valve for an inner tube of my construction whereby the compartments may be readily inflated.

In addition to the foregoing this invention comprehends improvements in the details of construction and arrangement of parts to be hereinafter described and particularly set forth in the appended claims.

In the accompanying drawings in which similar and corresponding parts are designated by the same characters of reference throughout the several views in which they appear.

Figure 1 is a view in transverse section, partly in perspective illustrating an inner tube constructed in accordance with my invention.

Figure 2 is a view in section on an enlarged scale of the valve, and

Figure 3 is a transverse section taken on the line 3—3 of Figure 2.

With reference to the drawings, 10 indicates the ordinary pneumatic tire casing having the clincher bead 11. Enclosed within the casing is an inner tube constructed in accordance with my invention and comprising the tubular casing 12 which is annular and continuous throughout its length. Extending across the interior of the casing 12 are a plurality of partitions 13 normally forming chords of the cross sectional circumference of the casing, said partitions being annular, that is, extended around the inner tube continuously and are extended from points adjacent the inner periphery of the tube outward, radiating and secured at their outer edges to the inner surface of the casing 12 at points in spaced relation as shown in Figure 1. In this manner a plurality of contiguous annular compartments 14 is defined. Each compartment is independent of the other and separately inflatable, and I provide a specific form of valve consisting of the tubular casing 15 having a circular enlargement 16 at one end designed to be inserted between the clincher beads 11 of the tire. The casing 15 is provided with a plurality of longitudinal passages 17 of which five are preferably provided, but corresponding in number to the number of compartments 14. Tubular extensions 18 extend from the enlarged portions 16, each tubular extension communicating with one of the channels 17. The outer end of each tubular extension 18 is threaded and is designed to receive a nut 19. A plurality of openings are provided in the inner periphery of the casing 12 of the inner tube, one opening communicating with each of the compartments 14 and the corresponding tubular extension 18 is inserted in the corresponding opening, the walls of the casing 12 being slipped around the nut 19. A nut 20 also engaging the threaded portion of the tubular extension 18 is then turned to bear tightly against the wall of the inner tube and to form an air tight joint. Subsequently cement or the like may be applied to further ensure the formation of a tight joint. A valve seat 21 is formed midway of the length of each passage 17 and a rod 22 is extended through each passage and carries a valve 23 bearing against the seat 21. A coil spring 24 is embraced about each rod and is designed to retain the valve upon its seat. The outer end of each rod is guided within a slug 25 threaded within the channel 17 so that it may be engaged by any instrument inserted in the channel to discharge the air from any compartment when desired. The outer end of the casing 15 is then threaded to receive a cap 26 which excludes dust.

In operation, the pump is applied to the end of the casing 15 and all of the compartments 14 inflated uniformly and simultaneously. It will be obvious that in the event that any compartment should be punctured by the penetration of nails or other objects through the tire casing and the air in said compartment permitted to escape the expansion of the remaining air within the tire will thrust the next adjacent partition wall 13 against the ruptured wall and thus form a tight joint. In this manner the tire will not become totally deflated as would occur where the inner tube is formed with only a single channel. Thus, a single puncture more or less would not delay travel and if desired the tire could be again pumped up to the required pressure. It will be obvious that owing to the fact that the outer ends of the partitions 13 are secured to the casing 12 at points in spaced relation that a sharp object penetrating the thread portion can puncture only one compartment at a time. Other uses and advantages will readily occur to those familiar with the art to which this invention appertains.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention what I claim as new and desire to secure by United States Letters Patent is:—

1. An inner tube including an endless tubular casing of elastic material, a plurality of circumferential partitions located therein forming a plurality of compartments, an inflating device including a casing, means formed at one end of said last mentioned casing for retaining the same in gripping relation with the clincher beads of a tire casing, said inflating device having a plurality of channels therein, a tube formed with the bead gripping portion and communicating with the respective channels, and means within each channel controlling the passage thereof.

2. An inner tube including an endless tubular casing of elastic material, a plurality of circumferential partitions located therein defining a plurality of compartments, an inflating device including a cylindrical casing, a disc formed at one end of said casing having an annular groove to be received between the clincher beads of a tire casing, said inflating device having a plurality of longitudinal channels therein, a tube formed integrally with the disc and communicating with each channel, and a spring press valve in each channel controlling the passage thereof.

In testimony whereof I affix my signature.

JOSEPH A. ROGERS. [L. S.]